United States Patent
Eugster

(10) Patent No.: US 6,626,086 B2
(45) Date of Patent: Sep. 30, 2003

(54) SAFETY DEVICE OF A STEAM-FROTHING DEVICE FOR PRODUCING A FROTHY BEVERAGE

(75) Inventor: Arthur Eugster, Romanshorn (CH)

(73) Assignee: Eugster Frismag AG, Romanshorn (CH)

(*) Notice: Subject to any disclaimer, the term of this patent is extended or adjusted under 35 U.S.C. 154(b) by 0 days.

(21) Appl. No.: 10/150,149

(22) Filed: May 20, 2002

(65) Prior Publication Data

US 2002/0134248 A1 Sep. 26, 2002

Related U.S. Application Data

(63) Continuation of application No. 10/066,786, filed on Feb. 6, 2000, now abandoned.

(30) Foreign Application Priority Data

Feb. 6, 2001 (DE) ...................................... 201 02 048 U

(51) Int. Cl.[7] .............................................. A47J 31/58
(52) U.S. Cl. ......................... 99/323.1; 99/293; 99/453; 261/DIG. 76
(58) Field of Search ................................ 99/293, 323.3, 99/323.1, 287, 275, 453, 452; 261/78.1, DIG. 16, DIG. 76

(56) References Cited

U.S. PATENT DOCUMENTS

| 5,738,002 A | * | 4/1998 | Marano-Ducarne | .......... 99/293 |
| 5,768,981 A | * | 6/1998 | Cicchetti | .................. 99/293 X |
| 6,158,328 A | | 12/2000 | Cai | .............................. 99/293 |

FOREIGN PATENT DOCUMENTS

| DE | 710891 | 9/1941 |
| DE | 69600467 | 12/1998 |
| DE | 199 21 483 | 8/2000 |
| EP | 1086642 | 3/2001 |

* cited by examiner

Primary Examiner—Reginald L. Alexander
(74) Attorney, Agent, or Firm—Venable LLP; Norman N. Kunitz

(57) ABSTRACT

A safety device for a steam frothing machine to form a froth beverage, which machine has a steam pipe (3) that is connected to a steam generator 1' and has a steam discharge opening (13), and a frothing head (4), which can be pushed onto the steam pipe and surrounds the steam discharge opening (13) in the mounted state. To protect an operator from steam in the event that the steam discharge is accidentally activated when the frothing head is removed, a hollow body is pushed onto the steam pipe (3) and enable the discharge of steam essentially downward in an enabling position. In a position other than the enabling position of the hollow body, the downward discharge of steam is essentially prevented.

12 Claims, 3 Drawing Sheets

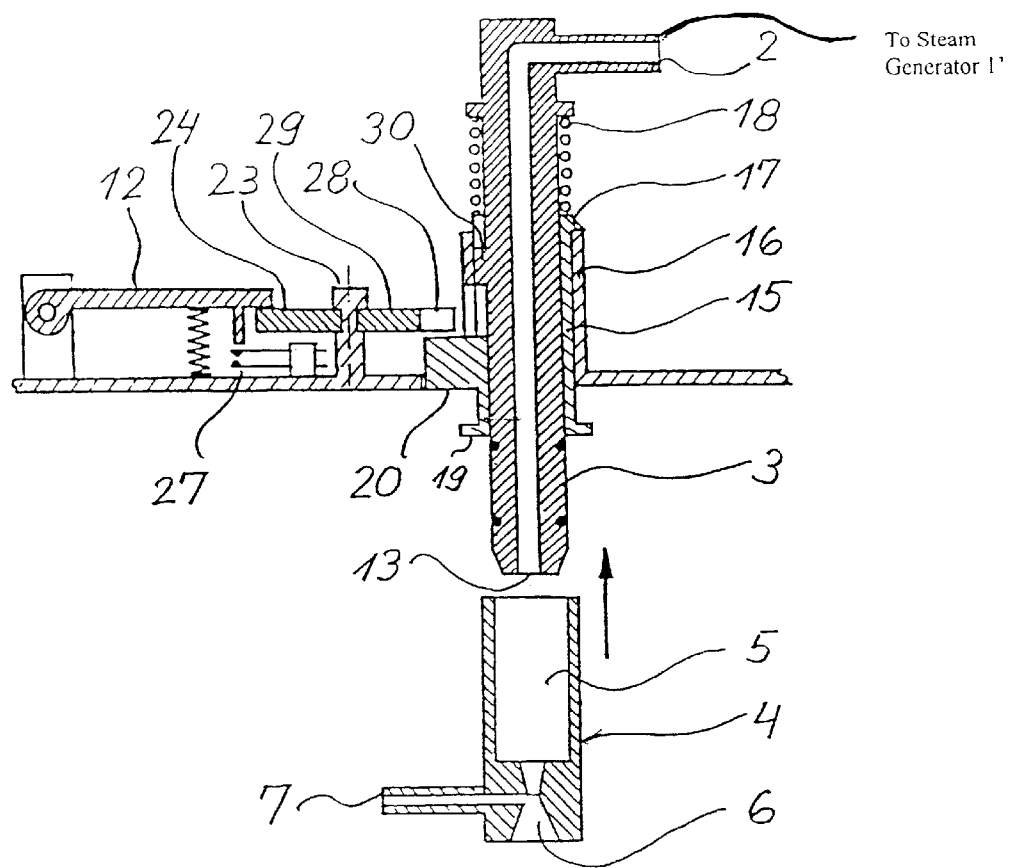
Fig.2
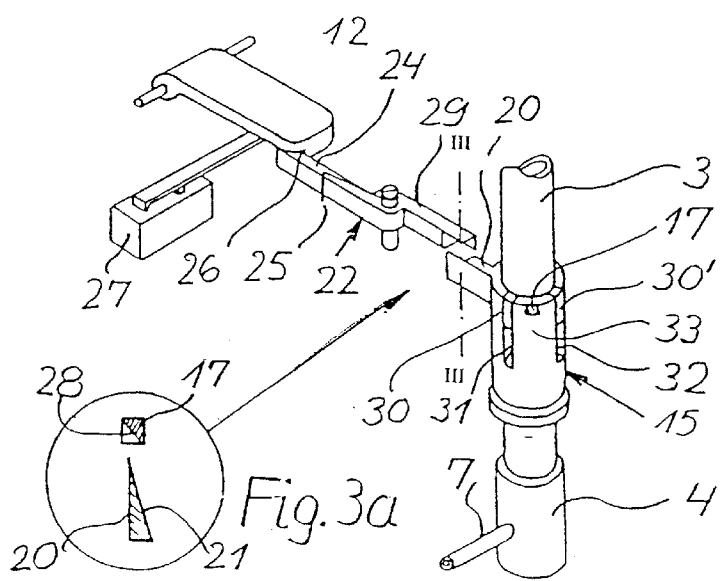
Fig.3
Fig.3a

SAFETY DEVICE OF A STEAM-FROTHING DEVICE FOR PRODUCING A FROTHY BEVERAGE

CROSS REFERENCE TO RELATED APPLICATION

This application is a continuation of U.S. patent application Ser. No. 10/066,786 filed Feb. 6, 2000, now abandoned.

This application claims the priority of German Patent Application No. 201 02 048.3 filed Feb. 6, 2001, which is incorporated herein by reference.

BACKGROUND OF THE INVENTION

The invention relates to a safety device for a steam-frothing device for producing a frothy beverage. More specifically, the present invention relates to a safety device of a steam-frothing machine or device for producing a frothy beverage, particularly frothy hot chocolate or cappuccino, which machine has a steam pipe that is connected to a steam generator and that has a steam discharge exit, and has a frothing head that encloses the steam discharge opening in the mounted state.

Typically, cappuccino is prepared with an espresso machine, with milk froth being produced in a separate milk container that is a component of the espresso machine and is connected to the machine's steam generator. To produce cappuccino or frothed milk without a costly espresso machine, however, a relatively simple steam-frothing device can also be provided, the device essentially encompassing a steam generator and an automatic froth nozzle.

Analogously to an espresso machine, a steam-frothing device of this type includes a steam generator, which may be embodied as a flow heater, and a pump, which is connected to a water reservoir for pumping controlled amounts of water through the flow heater to create steam. When the steam-frothing device is turned on, a heating element of the flow heater is activated and maintained, by a thermostat at a predetermined temperature in a stand-by mode. To produce the steam, a steam start key is depressed, thereby activating the pump. This causes water to be pumped out of the reservoir and into the flow heater, where it evaporates and flows, as slightly over-stressed steam, through the frothing head adjoining the steam pipe. The frothing head is embodied such that a vacuum is generated inside it when the steam passes through, which vacuum simultaneously draws milk out of a separate milk container and air into the head. Inside the frothing head, the milk and air are whipped together. The milk froth exiting the frothing head can flow directly into a vessel positioned beneath the frothing head.

It is desirable to be able to remove the frothing head from the steam line, particularly because the frothing head contains dried milk residue following the froth preparation, and therefore must be washed. For this purpose, the head is embodied or formed to be easily removed from the steam pipe. If the steam start key is accidentally pressed when the frothing head is removed, over-stressed steam rapidly exits the steam discharge opening of the steam pipe, which may also be referred to as the steam discharge pipe, typically downward, so the operator faces the threat of being scalded.

Because the frothing device can be used not only to make cappuccino, a frothy coffee-and-milk beverage, but also frothy hot chocolate, a favorite children's beverage, and it must be considered that children may wish to prepare the frothy hot chocolate themselves, it is an object of the present invention to make the steam-frothing device safer to handle.

Accordingly, it is an object of the present invention to configure a safety device for a steam-frothing device of the generic type mentioned at the outset such that, if an operator makes an operating error, such as activating the steam release when the frothing head is removed, the operator is reliably protected from steam exiting the steam pipe, without further complicating the operation.

SUMMARY OF THE INVENTION

The above object generally is accomplished according to the present invention in that a hollow body can be pushed onto the steam pipe, with the hollow body, permitting an essentially downward discharge of steam in an enabling position, and essentially blocking the downward steam discharge when in a position other than the enabling position of the hollow body. The hollow body that can be pushed onto the steam pipe is either a sliding sleeve that is pushed upward with the frothing head when the head is placed on the steam pipe, or, in a suitable embodiment of the steam pipe, is the frothing head itself. In both cases, a downward steam discharge that may injure an operator is effectively prevented when the frothing head is not connected to the steam pipe. It is not necessary to perform a separate operating procedure to prevent the undesired exit of steam.

In the first embodiment of the safety device, the hollow body is a sliding sleeve that is mounted on the steam pipe, and that is automatically pushed into a blocking position due to prestressing or biasing by a spring when the frothing head is removed from the steam pipe. In this blocking position, the hollow body prevents an undesired steam discharge from the steam discharge opening in a manner to be described below. When the frothing head is pushed onto the steam pipe, the frothing head pushes the sliding sleeve into an enabling position, in which it permits a discharge of steam from the steam discharge opening. The operator therefore need not take any further operating measures other than normal handling of the frothing head for activating the safety device and preventing a steam discharge in a dangerous direction.

According to one version of the first embodiment of the invention, the sliding sleeve is a component of a steam-frothing device having a circuit that activates the production and release of steam, usually a pump and a steam starting contact, that can be actuated by a steam start key. The safety device includes a movable blocking element that is actuated by the sliding sleeve and is formed such that it blocks the steam start key and/or the circuit in the blocking position. The safety device thus includes only a few additional parts, particularly the sliding sleeve and the blocking element.

In a preferred version of the safety device, the circuit that activates the steam release includes a pair of normally open contacts, with the starting contact being connected in series with a second contact. The two contacts can be activated or closed by the blocking element, and by the steam start key, respectively. The pump is only activated when the steam start key is depressed, which closes the steam starting contact of the contact pair, and the blocking element has closed the second contact of the contact pair in the unblocked or enabling position.

In accordance with another embodied of the safety device, the blocking element is a horizontally-pivotable double pivoting arm whose first arm is normally pivoted into a blocking position under the steam start key, where it prevents the key from being depressed, while the second arm cooperator with an inclined surfaces of a lifting arm that is connected to the sliding sleeve such that the first arm of the double pivoting arm is pivoted away from beneath the steam start key when the frothing head attached to the steam pipe raises the sliding sleeve. In this way, it is possible to lock and release a steam start key whose actuation direction extends parallel to the substantially vertical axis of the steam pipe to facilitate operation. The sliding sleeve is also displaced along this axis.

In this embodiment of the invention, the vertical sliding movement of the sliding sleeve is converted into a horizontal blocking movement of the double pivoting arm. For this purpose, the lifting arm has a lifting-arm angled or inclined member that engages an angled or inclined member of the second arm of the double pivoting arm. Moreover, the double pivoting arm is spring-loaded in the direction of the blocking position by a restoring spring. When the sliding sleeve with the attached lifting arm is raised, the angled member of the lifting arm presses the angled member of the second arm of the double pivoting arm to the side, so that the double pivoting arm is moved, counter to the force of the restoring spring, from the blocking position and into the enabling position. The sliding sleeve is spring-loaded such that the spring presses it downward. The displacement path of the sliding sleeve is limited by stop latches that are disposed on the sleeve, and that engage a housing bushing so that the sliding sleeve stops in the blocking position against the housing bushing. The blocking position is thus exactly defined.

A particular advantage in accordance with the sliding sleeve provided with the stops is that at least two vertical slots that are open at the top are cut into the sliding sleeve with mutual spacing at the circumference, so that a tab is respectively formed between the slots. For mounting the sliding sleeve, the tab or tabs can be resiliently compressed, so that the sleeve can easily be inserted into and through the housing bushing, after which the compressed tabs can re-expand and the stop latches slide outward past an upper edge of the housing bushing.

In a second variation of the safety device, the steam discharge opening of the steam pipe is essentially oriented radially toward the back of the steam-frothing device housing, i.e., in the direction of a front housing wall. The brewing head itself serves as the hollow body that can be pushed onto the steam pipe. The frothing head is internally configured so that follows: A vertical groove, which is open at the bottom, is cut into the upper region of the cylindrical or sleeve portion of the head to form a steam conduit, into which the steam discharge opening of the steam pipe terminates when the brewing head is pushed onto the steam pipe and is therefore operational. If, in contrast, the frothing head is removed from the steam pipe and the steam start key is inadvertently activated, the steam exiting the steam discharge opening of the steam pipe does not travel downward to hit the operator, but instead is directed away toward the front housing wall, where the steam cools, partially condenses and partially runs off harmlessly to the sides. The condensate can be collected in a collection tray. Preferably, the frothing head with the above-described internal configuration comprises two parts, i.e., a cylindrical sleeve portion containing the vertical grave and a frothing head portion and is therefore easier to clean and simple to manufacture.

Three exemplary embodiments of the safety device in accordance with the invention are described below, in conjunction with the five figures of the drawing, from which further features of the invention ensue.

BRIEF DESCRIPTION OF THE DRAWINGS

FIG. 2 is a longitudinal section through a first embodiment of the safety device according to the invention FIG. 3 is a perspective view of the first embodiment of the safety device shown in FIG. 2, but without the housing bushing 16.

FIG. 3a is a section in the sectional plane of the line III—III of FIG. 3.

DESCRIPTION OF THE PREFERRED EMBODIMENTS

Figure 1:
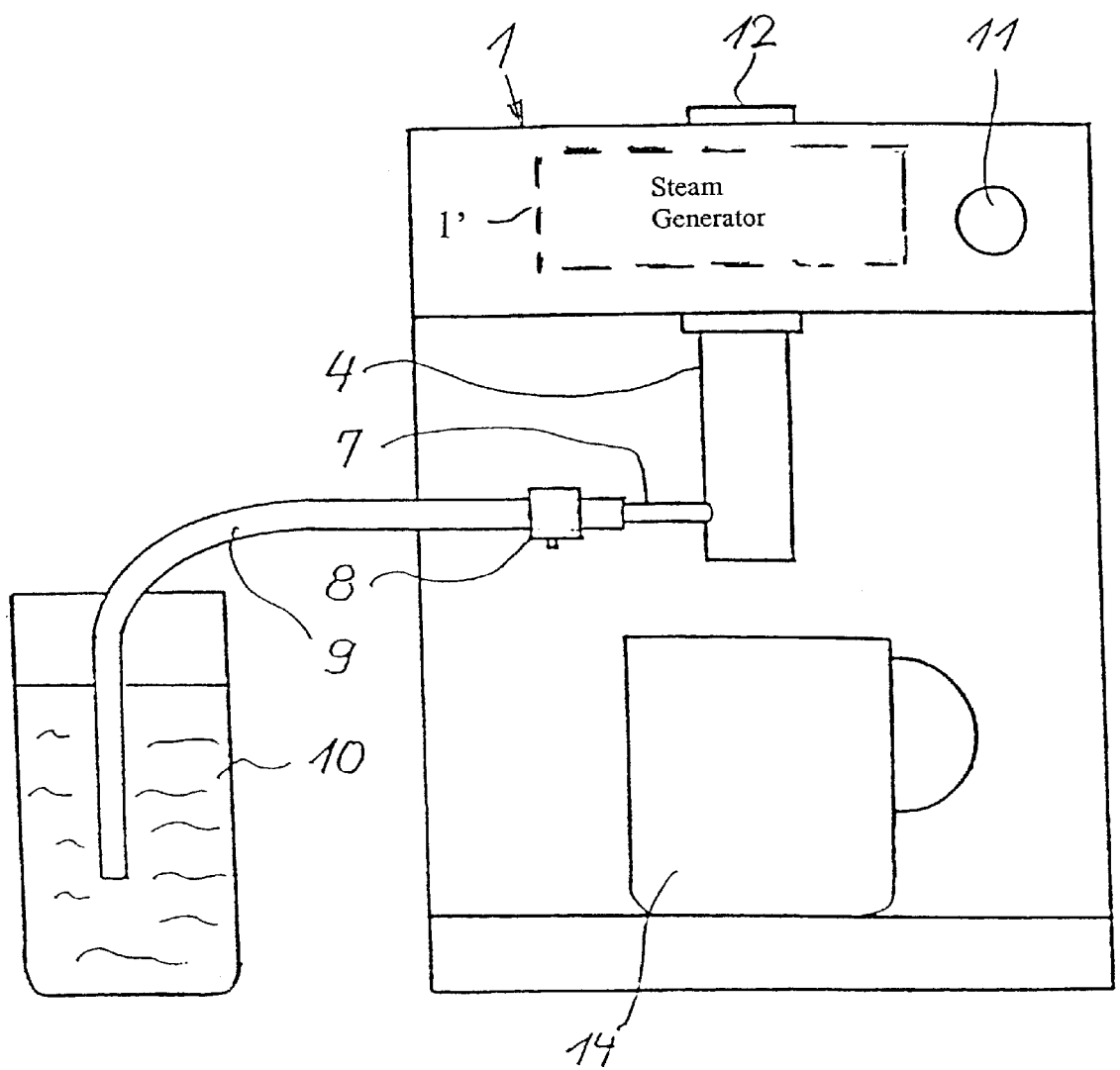
FIG. 1 is a schematic, frontal view of a frothing device, into which the safety device according to the invention is inserted.

FIG. 1 depicts a housing 1 of a steam-frothing device or machine, in which a conventional steam generator 1', having a flow heater, a water reservoir, and a pump that connects the flow heater to the water reservoir, is accommodated. In accordance with FIG. 2, an outlet of the flow heater of the steam generator 1' is connected via a steam-intake nozzle 2 to a steam pipe 3, which is substantially vertically oriented and onto whose lower end a frothing head 4 can be placed.

The frothing head 4 has an upper, essentially cylindrical recess 5, into which a lower end of the steam pipe 3 can be inserted steam-tight as a result of O-rings, and a venturi-tube-like recess 6 that extends from the bottom of recess 5 to the lower end surface of the frothing head 4, A milk/lair intake nozzle 7 terminates in the recess 6. The milk/lair intake nozzle 7 is connected, via an air-intake unit 8, through which air can flow into the milk/lair intake nozzle 7, to a milk-intake nozzle 9 that extends into a milk container 10.

FIG. 1 depicts a mains switch 11 that is recessed into a side of the housing that protrudes forward, and a steam start key 12 that can be seen on the top of the housing.

The main switch 11 turns on the steam-frothing device or machine whereupon the flow heater is heated to a predetermined, thermostat-regulated temperature that suffices to evaporate water conveyed into the flow heater for producing slightly-prestressed steam. The steam start key 12 starts the pump of the steam generator, which pumps a metered quantity of water into the flow heater for evaporation. The steam is supplied to the steam inlet 2 and steam pipe 3, and the steam flowing out of the steam discharge opening 13 of the steam pipe 3 and into the frothing head 4 draws in an air-milk mixture via the milk-intake nozzle 7. The mixture is then whipped into a milk-air-steam mixture with the steam in the frothing head 4. The froth flows directly into a vessel 14 positioned beneath the lower end of the frothing head 4.

With the first embodiment of the safety device according to FIGS. 2 and 3, the steam start key 12 is prevented from being depressed for producing steam when the frothing head 4 is removed from the lower end of the steam pipe 3, so the steam cannot flow toward the operator.

The first embodiment of the safety device has an axially displaceable sliding sleeve 15 that is inserted, during assembly into a bushing 16 mounted on the housing, so that both of the sleeve 15 and the bushing 16 support the steam pipe 3. The sleeve 15 latches in the bushing 16 via radically extending projections 17 and 19 at the upper and lower ends, respectively of the sleeve 15, and is urged in a downward direction under the force of a spring 18. During the insertion process, the upper stop latches 17, which project laterally out of the sliding sleeve 15 and have an inclined circumferential edge, slide up past the illustrated upper edge of the housing bushing 16 and rest against the upper bushing edge in the blocking position. The spring 18 presses the sliding sleeve 15 into the illustrated blocking position, as long as the sleeve 15 is not pushed up by the frothing head 4 attached to the bottom of the steam pipe 3 and resting against a lower flange 19 of the sliding sleeve 15.

Projecting laterally from the sliding sleeve 15 is a lifting arm 20, which has a lifting-arm angled member 21 at its end face. In the blocking position of the sliding sleeve 15, this angled member 21 is located beneath one end of one arm 29 of a double pivoting arm 22 that is seated on a rotating pin 23 so as to rotate in a horizontal plane. The other arm 24 of the double pivoting arm 22 is normally rotated or positioned under the steam start key 12 by a restoring spring 25, where the arm 24 rests against a recess 26 of the steam start key 12 (FIG. 3). Thus, the steam start key 12 cannot be depressed and actuate or close a steam starting contact 27 to turn on the pump of the steam generator 1'.

When the frothing head 4 is pushed onto the lower end of the steam pipe 3, in contrast, the sliding sleeve 15 is pushed upward and the lifting-arm angled member 21 travels beneath a mating angled member 28 of the second arm 29 of the double pivoting arm 22, thereby rotating the double pivoting arm 22 about the rotating pin 23, as the axis of rotation, so far out of its resting position that the start key 12 can be depressed and the steam starting contact 27 can be actuated.

Whenever the frothing head 4 is removed from the steam pipe 3, the spring 18 pushes the sliding sleeve 15 back down into the blocking position, causing the arm 24 to pivot beneath the steam start key 12 and prevent depression of the key 12.

Three sliding latches 30, 30' (only two of which are shown) disposed in a star configuration around the circumference of the steam pipe 3 serve, among other things, as connecting parts for permanently connecting the steam pipe 3 to the housing bushing 16 of the housing 1.

Corresponding to the sliding latches 30, 30' are three longitudinal slots that are cut into the circumference of the sliding sleeve 15, near the top, likewise in a star formation.

Of these three slots, two slots 31 and 32 can be seen in FIG. 3. With the slots 31, 32, the sliding latches 30, 30' guide the sliding sleeve 15 in the longitudinal direction of the steam pipe 3. In addition, the arrangement of these three slots in the upper segment of the sliding sleeve 15 leaves three tabs, with a respective tab 33, e.g., between each two slots, e.g., 31 and 32. As a result, the tabs 33 are elastic, so the sliding sleeve 15 is compressed in the mounting procedure, when it is pushed from below through the housing bushing 16 until the stop latch 17 at each upper end of the tab snaps beyond the upper edge of the housing bushing 16, and the sliding sleeve 15 re-assumes its original shape.

In the perspective view of the first embodiment of the safety device in FIG. 3, the housing bushing 16 has been omitted to offer a better view of the sliding sleeve 15.

Figure 4:
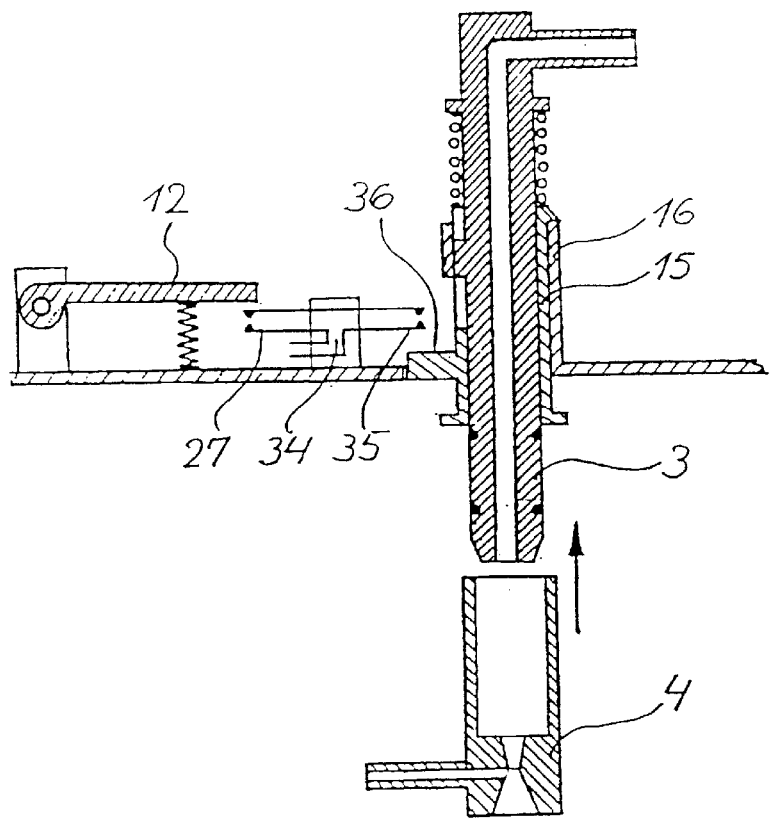
FIG. 4 is a longitudinal sectional view through a second version of the safety device according to the invention

The second embodiment of the safety device, shown in FIG. 4, basically differs from the first version according to FIGS. 2 and 3 in that the double pivoting arm 22, the rotating pin 23 and the restoring spring 24 for mechanically stopping the steam start key 12 are omitted and, instead, a circuit 34 with a pair of contacts is provided, with this circuit 34 comprising the steam starting contact 27 and a second contact 35 that is connected in series with the steam starting contact 27. The second contact 35 can be actuated by a lifting arm 36, which, like lifting arm 20 in the first embodiment, projects laterally from the sliding sleeve 15, but requires no lifting-arm angled member. Relative to the circuit 34, the lifting arm 36 is disposed such that, in the illustrated blocking position of the sliding sleeve 15, the lifting arm 36 is at a distance from the second contact 35, which is a normally open contact. In this blocking position of the sliding sleeve 15, therefore, steam generation cannot be initiated, even if the steam starting contact 27 of the circuit 34 is inadvertently closed through the depression of the steam start key 12. If, in contrast, the frothing head 21 is attached to the lower end of the steam pipe 3, so the sliding sleeve 15 is pushed up to the enabled position, the lifting arm 36 closes the second contact 35 of the double contact 34, which can thus initiate the steam generation in this enabled position when the steam start key 12 is actuated.

Figure 5:
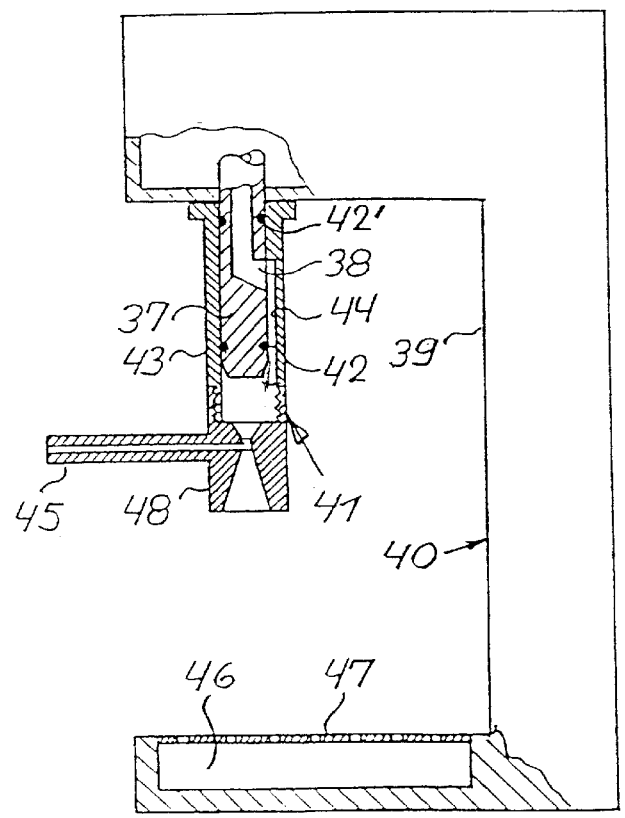
FIG. 5 is a side view, partially cut away, of a third version of the safety device according to the invention, as a component of a steam-frothing device.

FIG. 5 illustrates the third embodiment of the safety device of a steam-frothing device. The advantage with this embodiment is that no movable parts are required, aside from the standard detachable frothing head 4, which possesses a special embodiment.

For this embodiment, the steam-frothing device is provided with a modified steam pipe 37, whose discharge opening 38 is not oriented downward as in the care of the other embodiments, but toward the rear, and faces a front housing wall 39 of a housing 40. For sealing an attached frothing head 41, O-rings 42, 43 are set into the lower end of the steam pipe 37, similarly to the steam pipe 3 of the above-described versions, for which the O-rings, while illustrated, are not specifically identified and described.

A vertical groove 44 that is open at the bottom is formed in the inner wall of an upper cylindrical or sleeve portion 43 of the frothing head 41. Together with the steam pipe 37, this groove 44 forms a steam conduit between the steam discharge opening 38 and a remaining, cylindrical hollow space above the lower portion 48 of the frothing head 41, into which a milk/lair intake nozzle 45 terminates in the usual manner. In this lower portion 48, the interior of the frothing head 41 is formed similarly to that of the frothing head 4. In contrast to the latter, however, the lower part of portion 48 of the frothing head 41, which supports the milk/lair intake nozzle 45, can be separated from the upper portion or part 43 of the frothing head disposed above it, because both parts 43, 48 are detachably connected by a thread 41 that is indicated in the drawing but not described in detail.

Disposed in the bottom region of the steam-frothing device or machine is a collection tray 46, which is covered by a perforated sheet 47.

If the frothing head 41 is removed from the steam pipe 37 and a steam start key, not shown in FIG. 5, is inadvertently actuated, thereby initiating the generation of steam, the steam flows out of the discharge opening 38 of the steam pipe 37 and to the rear, where it impacts the front housing wall 39, cools there, and becomes distributed or condensate to all sides. Afterward, the condense is collected by the collection tray 46 as it runs off. Practically no steam is conducted downward and forward, onto the operator.

When, in contrast, the frothing head 41 is pushed onto the lower end of the steam pipe 37 and surrounds its discharge opening 38 so the groove 44 assumes the position illustrated in FIG. 5, the steam flows downward through the steam conduit formed with the groove 44 after the steam start key has been actuated. There, the steam impacts the lower, inside region of the frothing head 41, which then produces milk froth in the above-described manner.

When the frothing head 41 is subsequently removed from the steam-frothing device and its two parts (43, 48) are unscrewed, its interior is easily accessible for cleaning.

The drawing does not represent any features for detachably connecting the frothing head to the lower end of the steam pipe, which can be embodied in a standard manner. In the third embodiment according to FIG. 5, these elements are not only embodied for limiting the height of the attached frothing head 41, but also for effecting an orientation in the circumferential direction, so the groove 44 assumes its desired position relative to the discharge opening 38.

While the invention was described above in connection with a steam-frothing device or machine, it can also be used in a corresponding espresso machine that falls into the category of a steam-frothing device according to the invention.

The invention now being fully described, it will be apparent to one of ordinary skill in the art that many changes and modifications can be made thereto without departing from the spirit or scope of the invention as set forth herein.

What is claimed is:

1. A safety device of a steam-frothing machine for producing a frothy beverage, with the machine having a substantially vertically oriented steam pipe that is connected to a steam generator and that has a steam discharge exit adjacent its lower end, and having a frothing head mounted on and normally enclosing the steam discharge opening; and wherein:

the safety device comprises a hollow body that is pushed onto the end of the steam pipe, and which, in an enabling position when the frothing head is mounted, permits an essentially downward steam discharge, while essentially blocking a downward steam discharge when in a position other than the enabling position of the hollow body;

the hollow body is a sliding sleeve that is mounted on the steam pipe and is automatically pushed into the blocking position due to biasing by a spring mounted on the steam pipe when the frothing head is removed from the steam pipe, in which blocking position it causes blocking of the discharge of steam from the steam discharge opening; and the sleeve is pushed into the enabling position when the frothing head is pushed onto the steam pipe, in which enabling position the discharge of steam from the steam discharge opening is enabled.

2. The safety device according to claim 1, further comprising: a normally open steam starting contact disposed in a circuit connected to the steam generator to initiate generation of the steam; a start key that actuates the steam starting contact; and a blocking element that is movable by the sliding sleeve and formed such that it blocks at least one of the steam starting key and the circuit in which the steam starting contact is disposed, in the blocking position of the sliding sleeve.

3. The safety device according to claims 2 wherein the circuit includes a further normally open contract that is connected in series with the steam start contact and that is actuated by the blocking element.

4. the safety device according to claim 2 wherein the blocking element is a horizontally-pivoting double arm member having a first arm that is pivoted to a position beneath the steam start key in the blocking position, thereby blocking the key, and a second arm that is acted on by a lifting arm connected to the sliding sleeve such that the first arm of the horizontally pivoting double arm member is pivoted away from the position beneath the steam start key when the frothing head attached to the steam pipe pushes the sliding sleeve upward from the blocking to the enabling position.

5. The safety device according to claim 4, wherein the lifting arm has a lifting-arm angled member that acts on a matching angled member of the second arm of the pivoting double arm; and the pivoting double arm is spring-loaded in the direction of the blocking position by a restoring spring.

6. The safety device according to claims 2, further comprising: at least one slot that is open at the top cut into an upper region of the sliding sleeve parallel to the longitudinal direction of the sliding sleeve; and a respective sliding latch protruding from the circumstances of the steam pipe and projecting into the respective at least one slot.

7. The safety device according to claim 6, wherein at least two of said slots that are open at the top are cut into the sliding sleeve, and spaced around the circumference, so that a respective tab is formed between two adjacent slots; a stop latch protrudes outwardly from an upper edge of at least one tab; and the sliding sleeve is mounted to slide in a housing bushing whose upper edge engages the stop latch of the tab, and prevents further downward movement of the sliding sleeve in the blocking position.

8. The safety device of a steam-frothing machine for producing a frothy beverage, with the machine having a substantially vertically oriented steam pipe that is connected to a steam generator and that has a steam discharge exit adjacent its lower end, and having a frothing head mounted on and normally enclosing the steam discharge opening; and wherein:

the safety device comprises a hollow body that is pushed onto the end of the steam pipe, and which, in an enabling position when the frothing head is mounted, permits an essentially downward steam discharge, while essentially blocking a downward steam discharge when in a position other than the enabling position of the hollow body;

at least one slot that is open at the top is cut into an upper region of the sliding sleeve parallel to the longitudinal direction of the sliding sleeve; and a respective sliding latch protrudes from the circumstances circumferential surface of the steam pipe and projects into the respective at least one slot.

9. The safety device according to claim 8, wherein: at least two of said slots that are open at the top are cut into the sliding sleeve, and spaced around the circumference, so that a respective tab is formed between two adjacent slots; a stop latch protrudes outwardly from an upper edge of at least one tab; and the sliding sleeve is mounted to slide in a housing bushing whose upper edge engages the stop latch of the tab and prevents further downward movement of the slinky sleeve in the blocking position.

10. The safety device of a steam-frothing machine for producing a frothy beverage, with the machine having a substantially vertically oriented steam pipe that is connected to a steam generator and that has a steam discharge exit adjacent its lower end, and having a frothing head mounted on and normally enclosing the steam discharge opening: and wherein:

the safety device comprises a hollow body that is pushed onto the end of the steam pipe, and which, in an enabling position when the frothing head is mounted, permits an essentially downward steam discharge, while essentially blocking a downward steam discharge when in a position other than the enabling position of the hollow body;

the steam discharge opening of the steam pipe is oriented essentially rearwardly toward a front housing wall of the steam frothing machine;

the hollow body that is pushed onto the steam pipe is an upper cylindrical portion of the frothing head; and a vertical groove that is open at the bottom is cut into the inner wall of the upper portion of the frothing head and forms a steam conduit, into which the steam discharge opening terminates when the frothing head is mounted on the steam pipe.

11. The safety device according to claim 10, wherein the frothing head comprises two portions including the portion into which the groove of the steam conduit is cut, and a lower portion into which a milk/air intake nozzle terminates and which has an internal shape that is conducive to creating a vacuum when steam flows in.

12. The safety device according to claim 11, wherein the two portions of the frothing head are connected via a screw connection.

* * * * *

UNITED STATES PATENT AND TRADEMARK OFFICE
CERTIFICATE OF CORRECTION

| | | |
|---|---|---|
| PATENT NO. | : 6,626,086 B2 | Page 1 of 1 |
| DATED | : September 30, 2003 | |
| INVENTOR(S) | : Arthur Eugster | |

It is certified that error appears in the above-identified patent and that said Letters Patent is hereby corrected as shown below:

<u>Title page,</u>
Item [63], Related U.S. Application Data, delete "Feb. 6, 2000" and insert
-- Feb. 6, 2002 --.

Signed and Sealed this

Second Day of December, 2003

JAMES E. ROGAN
*Director of the United States Patent and Trademark Office*